US008366447B2

(12) United States Patent
Gordon et al.

(10) Patent No.: US 8,366,447 B2
(45) Date of Patent: Feb. 5, 2013

(54) READING ALERTS AND SKIM-READING SYSTEM

(75) Inventors: Glen Gordon, St. Petersburg, FL (US); Joseph K Stephen, St. Petersburg, FL (US); Eric Damery, St. Petersburg, FL (US); Ralph E Ocampo, St. Petersburg, FL (US)

(73) Assignee: Freedom Scientific, Inc., St. Petersburg, FL (US)

( * ) Notice: Subject to any disclaimer, the term of this patent is extended or adjusted under 35 U.S.C. 154(b) by 625 days.

(21) Appl. No.: 11/163,267

(22) Filed: Oct. 12, 2005

(65) Prior Publication Data

US 2006/0080310 A1 Apr. 13, 2006

Related U.S. Application Data

(60) Provisional application No. 60/522,544, filed on Oct. 12, 2004.

(51) Int. Cl.
*G09B 21/00* (2006.01)
(52) U.S. Cl. .......................... 434/112; 434/116; 434/117
(58) Field of Classification Search ........... 434/112–117
See application file for complete search history.

(56) References Cited

U.S. PATENT DOCUMENTS

| 5,265,065 | A | * | 11/1993 | Turtle .................................. 1/1 |
| 5,404,514 | A | * | 4/1995 | Kageneck et al. ................ 707/5 |
| 5,576,955 | A | * | 11/1996 | Newbold et al. ............. 715/217 |
| 5,721,897 | A | * | 2/1998 | Rubinstein ............................ 1/1 |
| 5,794,233 | A | * | 8/1998 | Rubinstein ............................ 1/1 |
| 5,913,215 | A | * | 6/1999 | Rubinstein et al. ........... 707/708 |
| 6,014,680 | A | * | 1/2000 | Sato et al. ..................... 715/234 |
| 6,440,068 | B1 | * | 8/2002 | Brown et al. ................. 600/300 |
| 6,568,939 | B1 | * | 5/2003 | Edgar ........................... 434/179 |
| 6,697,781 | B1 | * | 2/2004 | Sahlberg ....................... 704/260 |
| 6,718,518 | B1 | * | 4/2004 | Plow et al. .................... 715/205 |
| 6,883,001 | B2 | * | 4/2005 | Abe ....................................... 1/1 |
| 6,922,702 | B1 | * | 7/2005 | Jensen et al. ......................... 1/1 |
| 7,398,201 | B2 | * | 7/2008 | Marchisio et al. ................ 704/9 |
| 2002/0147724 | A1 | * | 10/2002 | Fries et al. ..................... 707/100 |
| 2004/0143603 | A1 | * | 7/2004 | Kaufmann et al. ......... 707/104.1 |
| 2005/0071165 | A1 | * | 3/2005 | Hofstader et al. ......... 704/270.1 |
| 2006/0004725 | A1 | * | 1/2006 | Abraido-Fandino .............. 707/3 |
| 2006/0064313 | A1 | * | 3/2006 | Steinbarth et al. ................ 705/1 |
| 2007/0050341 | A1 | * | 3/2007 | Hull et al. .......................... 707/3 |

OTHER PUBLICATIONS

Section 508. <retreived from http://web.archive.org/web/20021208095427/www.section508.gov/index.cfm?FuseAction> <retreived at Dec. 9, 2002>.*
Marcus J. Huber, et al., "Recognizing the Plans of Screen Reader Users", Freedom Scientific Blind/Low Vision Group, Proceedings of the AAMAS 2004 Workshop on Modeling Other Agents from Observation (MOO 2004), Jul. 2004, pp. 1-8.
Smartdraw, "SmartDraw Flowcharting Center Basic Flowcharting Shapes and Symbols", http://www.smartdraw.com/tutorials/flow-charts/basic.htm, [retrieved from internet on Oct. 6, 2005], pp. 1-2.
Freedom Scientific, "Skim Reading", http://www.freedomscientific.com/fs_products/surfs_up/skim_reading.htm, [retrieved from internet on Oct. 6, 2005], pp. 1-4.
Board of Patent Appeals and Interferences Decision 2009-005381, dated May 24, 2010.

* cited by examiner

*Primary Examiner* — Robert J Utama
(74) *Attorney, Agent, or Firm* — Anton J. Hopen; Smith & Hopen, P.A.

(57) ABSTRACT

A screen reader software product including a pattern store containing at least one user-definable array of keywords relating to a subject of interest and skim reading module adapted to apply the at least one array of keywords to a target document whereby only portions of the target document matching the at least one array of keywords are output by the screen reader software to an end user.

17 Claims, 5 Drawing Sheets

READING ALERTS AND SKIM-READING SYSTEM

CROSS-REFERENCE TO RELATED DISCLOSURES

This disclosure claims priority to Provisional Patent Application No. 60/522,544, filed Oct. 12, 2004 the contents of which are incorporated herein by reference.

FIELD OF THE INVENTION

This invention relates to auditory interfaces for use by blind and low vision individuals. More, particularly, this invention relates to skim readers enabling blind and low vision individuals to scan through textual and non-textual display information in a document of interest.

BACKGROUND OF THE INVENTION

Personal computers and the Internet greatly enhanced communications and access to information from around the world. Typically, visual information is displayed upon a monitor screen and data can be added or manipulated via keystrokes upon an associated keyboard. Feedback is provided visually to the user by the monitor screen. Blind users cannot utilize the information appearing upon the monitor screen while visually impaired users may experience difficulty doing so. Accordingly, screen readers have been developed to assist blind and visually impaired users when they use a personal computer.

One such screen reader is JAWS® for Windows. When installed upon a personal computer, JAWS® provides access to the operating system, software applications and the Internet. JAWS® includes a speech synthesizer that cooperates with the sound card in the personal computer to read aloud information appearing upon the computer monitor screen or that is derived through communicating directly with the application or operating system. Thus, JAWS® provides access to a wide variety of information, education and job related applications. Additionally, JAWS® includes an interface that can provide output to refreshable Braille displays.

SUMMARY OF THE INVENTION

The present invention is a screen reader software product including a pattern store containing at least one user-definable array of keywords relating to a subject of interest and skim reading module adapted to apply the at least one array of keywords to a target document whereby only portions of the target document matching the at least one array of keywords are output by the screen reader software to an end user. The pattern store may be populated by historical collections of keyword arrays and the target document and the at least one array of keywords are associated together in the pattern store.

A Boolean tag on each keyword instructs the screen reader software to include portions of the target document matching the keyword or exclude portions of the target document matching the keyword responsive to the state of the Boolean tag. Alternatively the screen reader software includes portions of the target document matching the array of keywords or excludes portions of the target document matching the array of keywords responsive to the state of the Boolean tag. An expression parser is communicatively coupled to the reading module whereby keyword logic may be embedded into the at least one array. For example, a keyword search may output portions of a document that contain either "hello" or "goodbye."

An output configuration module is provided to modify a predetermined scope of the portions of the target document matching the at least one array of keywords. The predetermined scope of the portions of the target document are selected from the group consisting of characters, words, lines, sentences, paragraphs, pages, page breaks, and section breaks. Thus, scope quantitatively determines how much of the document proximate to the relevant keywords are output to the end user. The predetermined scope may include an integer value representing how many paragraphs, lines, words or characters are output before and after the keyword-matched portions of the document.

In an alternative embodiment of the invention, a screen reader software product includes an error checking module, a screen reading module communicatively coupled to the error checking module, and an error skimming mode whereby upon activation of the error skimming mode, the screen reader software skips content deemed error-free and only outputs content flagged by the error checking module as containing an error. For example, the error skimming mode may only stop at user-selectable strings patterns such as stray punctuation marks, multiple spaces, missing opening or closing quotes, missing opening or closing parenthesis, missing capital after punctuation or the like. The alert itself may be configurable. For example, a sound or a spoken alert may play responsive to the detection of a possible error. Optionally, the alert may be played prior to the output of the text (either by voice synthesis, Braille or other medium). Alternatively, the alert may be played subsequent to the output of the text. Each string pattern may be configured independently so that the action taken by the screen reader upon detecting an error is tailored to the preferences of the end user.

The present invention also relates to methods of controlling the output of a computer utilizing a screen reader function to enable a document to be skimmed for display information. The display information includes textual and non-textual features of the target document. The method includes the steps of providing a target document to be skimmed, providing one or more text rules, scanning the target document for concurrence between the text of the target document and the one or more text rules and outputting a portion of the text of the target document responsive to the concurrence in a user-appropriate format. A text rule can be made of one or more elements or parameters. The element can further include a Boolean tag wherein concurrence between text in the target document and the element of the text rule instructs the computer to include or exclude portions of the target document responsive to the state of the Boolean tag. The text rule can also have a Boolean tag wherein concurrence between text in the target document and the text rule instructs the computer to include or exclude portions of the target document responsive to the state of the Boolean tag. The screen reader function of the present invention can be provided by a screen reader program. The screen reader program can be JAWS®, Microsoft® Speech and Window-Eyes™. Optionally, the text of the target document that is output responsive to concurrences is customizable based upon user preferences. The output will be a user-appropriate including speech synthesizers, a refreshable Braille displays and viewers. The method can further prompt the user responsive to the concurrence. The prompt can precede the output of a portion of the text of the target document or it can follow the output. The prompt can instruct the user about the nature of the concurrence, such as describing the type of error in punctuation encountered. The prompt can also requests an action from the user responsive to the nature of the concurrence.

DETAILED DESCRIPTION OF PREFERRED EMBODIMENT

The present invention skims a document and only reads units of text containing or not containing keywords. Specify the keywords which should or should not be present and the unit which should be spoken, e.g. line, sentence or paragraph. Each pattern maybe saved and recalled via a Skim Reading History for reuse. For example, a user visits a regular News website and is interested in Political news. They may bring up their Politics Skim Reading Pattern. This may contain the names of persons of interest, places, keywords such as Election, etc. Another day they may be interested in Natural Disasters. They bring up their disaster Skim Reading pattern and review the same news page gleaning different information. A final example is of a researcher reading volumes of information looking for critical dates. They can choose their special pattern for gleaning important dates etc and Skim Read the volumes of information in an extremely timely manner.

Figure 1:
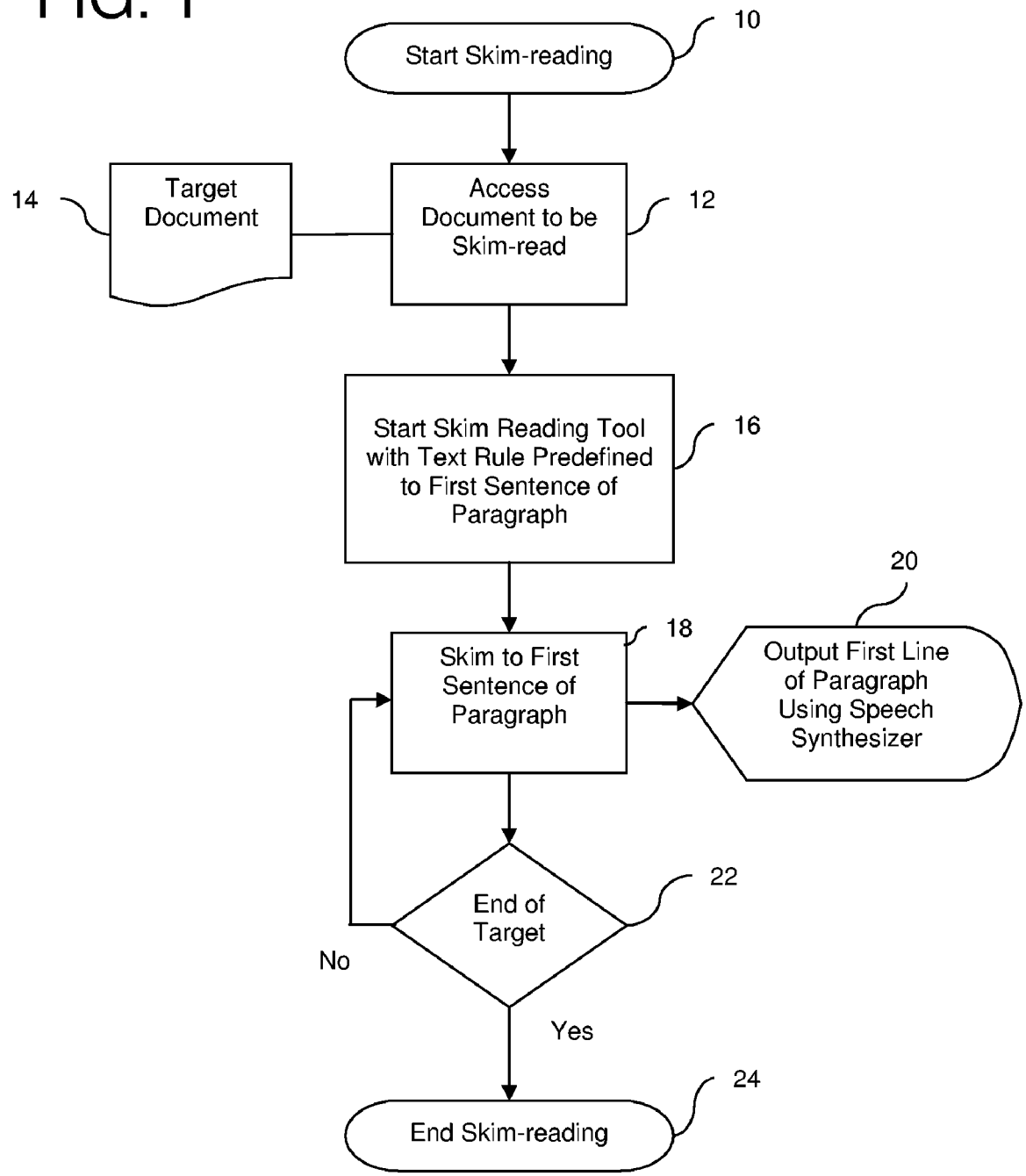
FIG. 1 is a flowchart of a process according to the present invention. The depicted process utilizes predefined text rules. Concurrences are output utilizing a speech synthesizer.

Referring to FIG. 1 there is displayed an embodiment of the present invention. In this embodiment a user is able to skim read a document by reviewing the first sentence of each paragraph. For example, a user brings up, or accesses 12, a lengthy document 14. Utilizing the invention 16, the skim reader reads the first sentence of a paragraph 18 and then skips to the first sentence of the next paragraph until the end of the target document is reached 22. The first sentence of each paragraph is sequentially output to the user by a speech synthesizer 20. Thus, the user is able to get through the document in far less time than would otherwise be possible.

Figure 2:
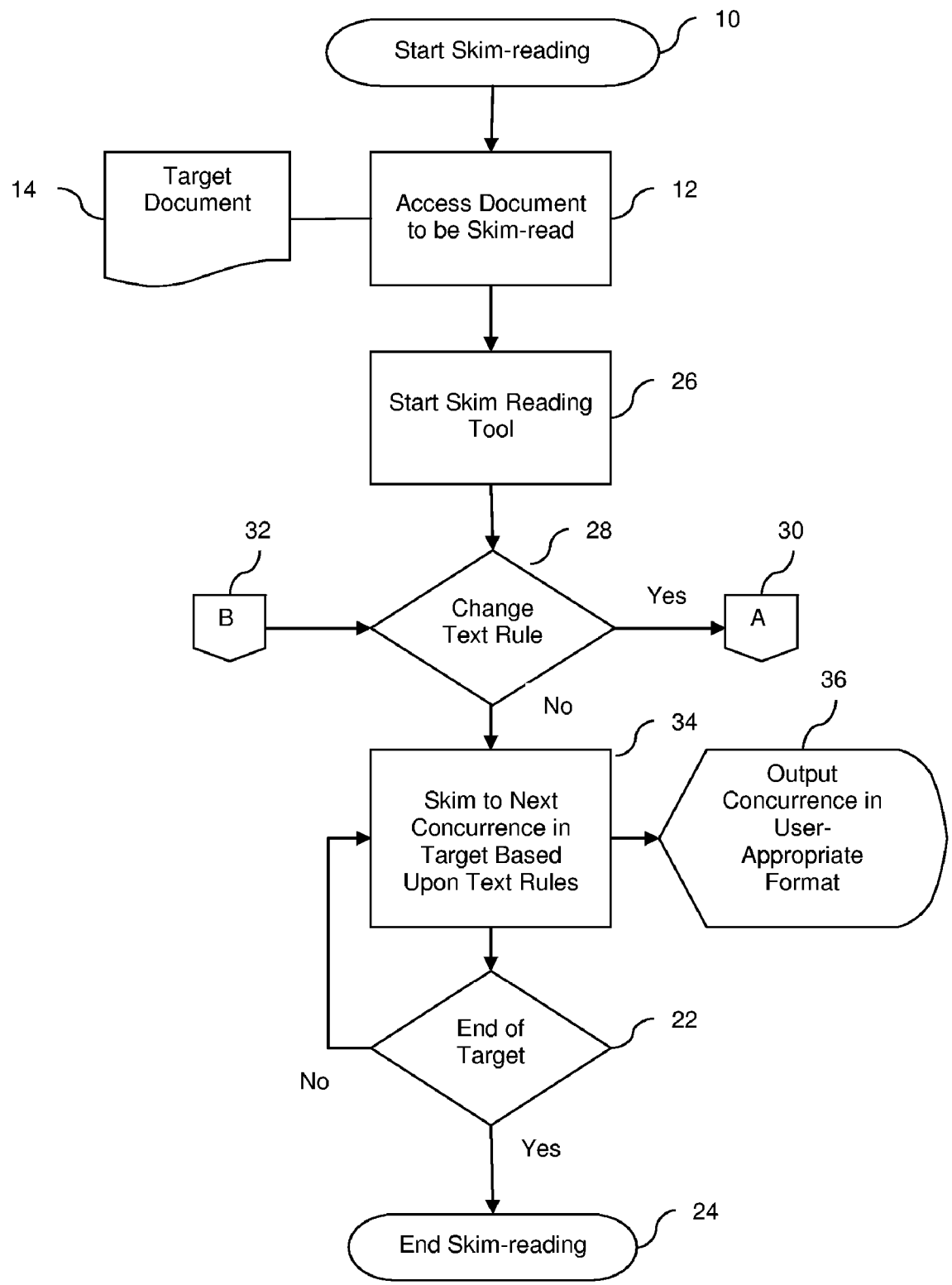
FIG. 2 is a flowchart of an alternative process according to the present invention. The depicted process allows a user to change the text rules to a desired preference. The skim-reader then executes the process according to the parameters of the selected text rule. Concurrences between the text and the selected text rule are sequentially output to a user-appropriate device.

Referring to FIG. 2 there is displayed another aspect of the skim-reader. The skim reader allows a user to select 28 which text rule or rules he desires to be applied to the target document 14. For instance, the rule could be a word or group of words, such as "Supreme Court." The skim reader will skim the target document for occurrences of "Supreme Court" in concurrence with the rule 34. These concurrences 34 with the text rule chosen 28 will be output to the user in a user appropriate format 36.

Figure 3:
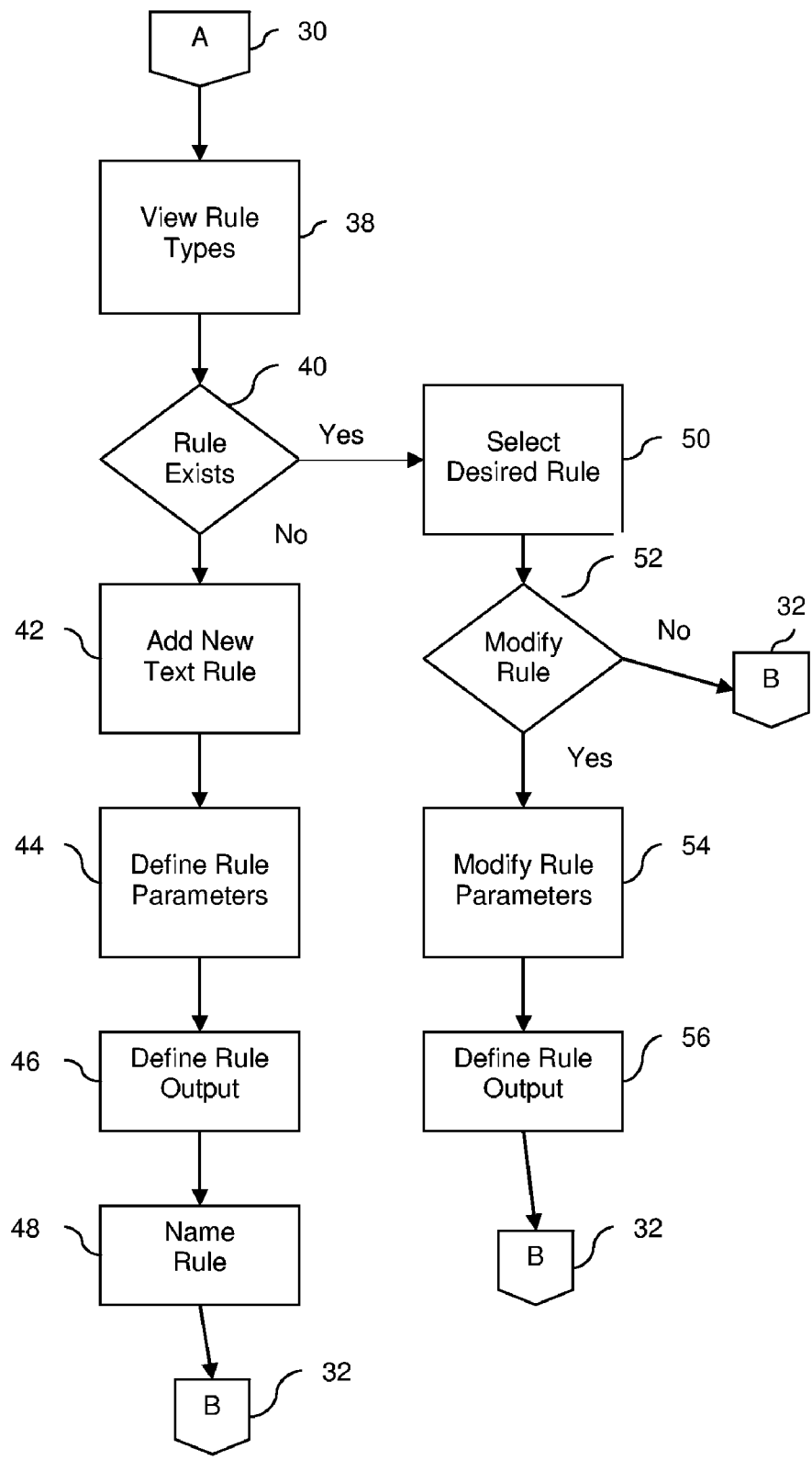
FIG. 3 is a flowchart of a process depicting the selection, modification or addition of a text rule according to the present invention.

The selection, modification or addition of a text rule is depicted in FIG. 3. An implementation of this process allows a user to select from a population of rules 50 or add a new rule 42. The population of rules can include default rules supplied with the implementation, along with rules previously created by the user. A rule within the population can be modified by selecting the rule and altering its parameters 54. The term "text rule" as used in the instant application refers to both textual display information and non-textual display information. Text rules can include a word or words, dates, names, and an alphanumeric character or string of characters. These can further include wildcards to broaden the applicability of the text rule. Text rules can also contain non-textual display information including, but not limited to, font format, paragraph format, bulleting, numbering, borders, shading, column format, page breaks, section breaks, tab settings, table structure, image data, case settings, comment field locations, hyperlink settings, data entry forms, and graphical user interface configuration. A text rule can include a Boolean tag instructing the screen reader software to include portions of the target document matching the keyword or exclude portions of the target document matching the keyword responsive to the state of the Boolean tag. A text rule can further include a parameter instructing the output of concurrences based upon user preferences 56. For instance, a user could specify the entire sentence to be output. Alternatively, if a user was searching for a word, the output could be limited to that word, possibly also containing information about the location of its occurrence in the target document or containing a few of the surrounding words. In other circumstances a user might desire an entire paragraph to be output wherever the word occurs. By utilizing this feature a user can exert a large degree of control over the output, specifying the minimum for a meaningful output, which can be crucial in effecting the length of time required to get through the target document.

In certain embodiments, the text rule can be an array of keywords. These keywords could relate to a subject of interest for a user. To broaden the scope of a given keyword, the keyword can include wildcard operators. Each keyword can also include a Boolean tag instructing the screen reader software to include portions of the target document matching the keyword or exclude portions of the target document matching the keyword responsive to the state of the Boolean tag. The array can also have a Boolean tag on instructing the screen reader software to include portions of the target document matching the array of keywords or exclude portions of the target document matching the array of keywords responsive to the state of the Boolean tag.

Figure 4:
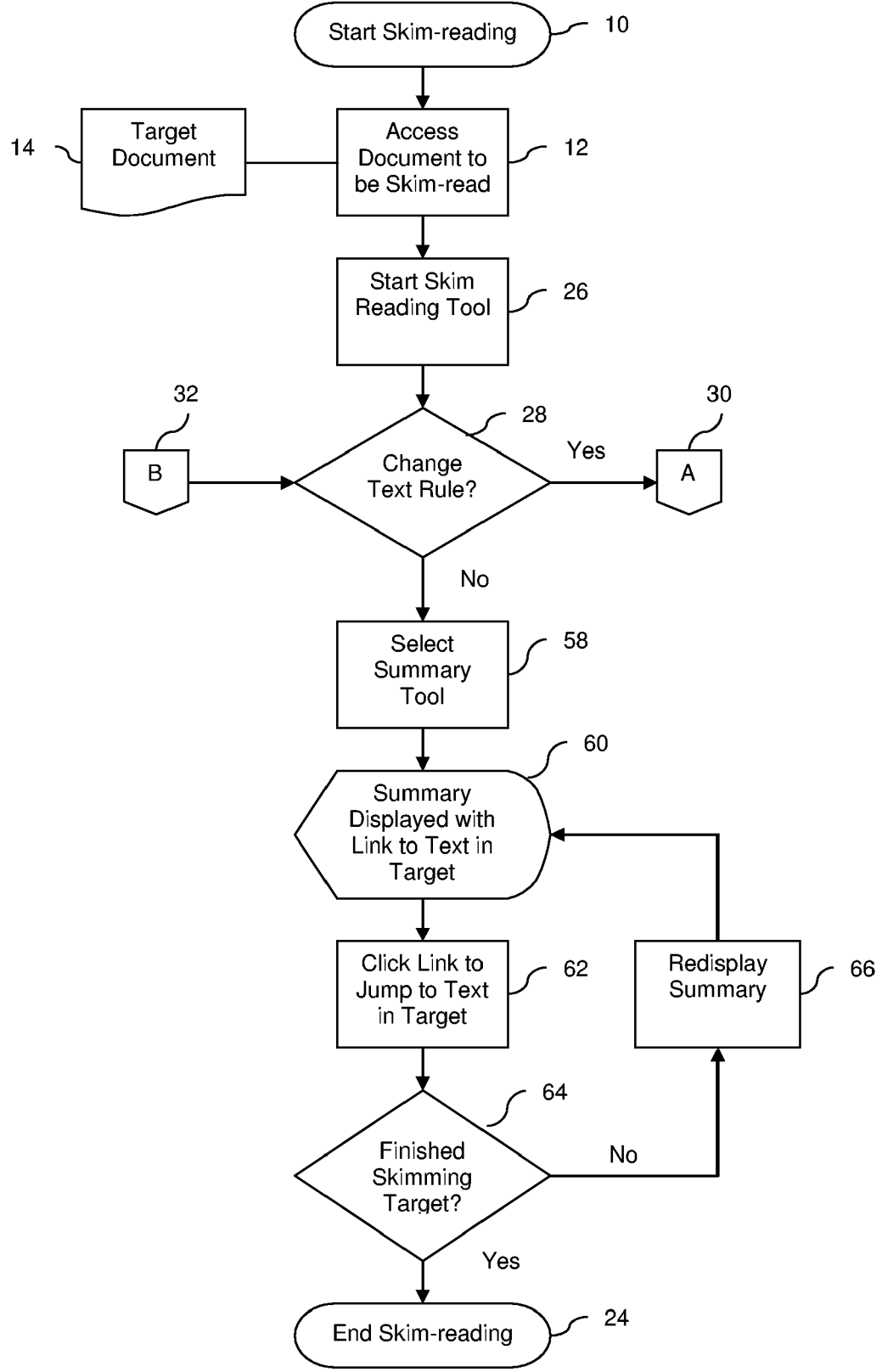
FIG. 4 is a flowchart of a process according to the present invention utilizing a skim-reading summary tool to link to text in a target document.
Figure 5:
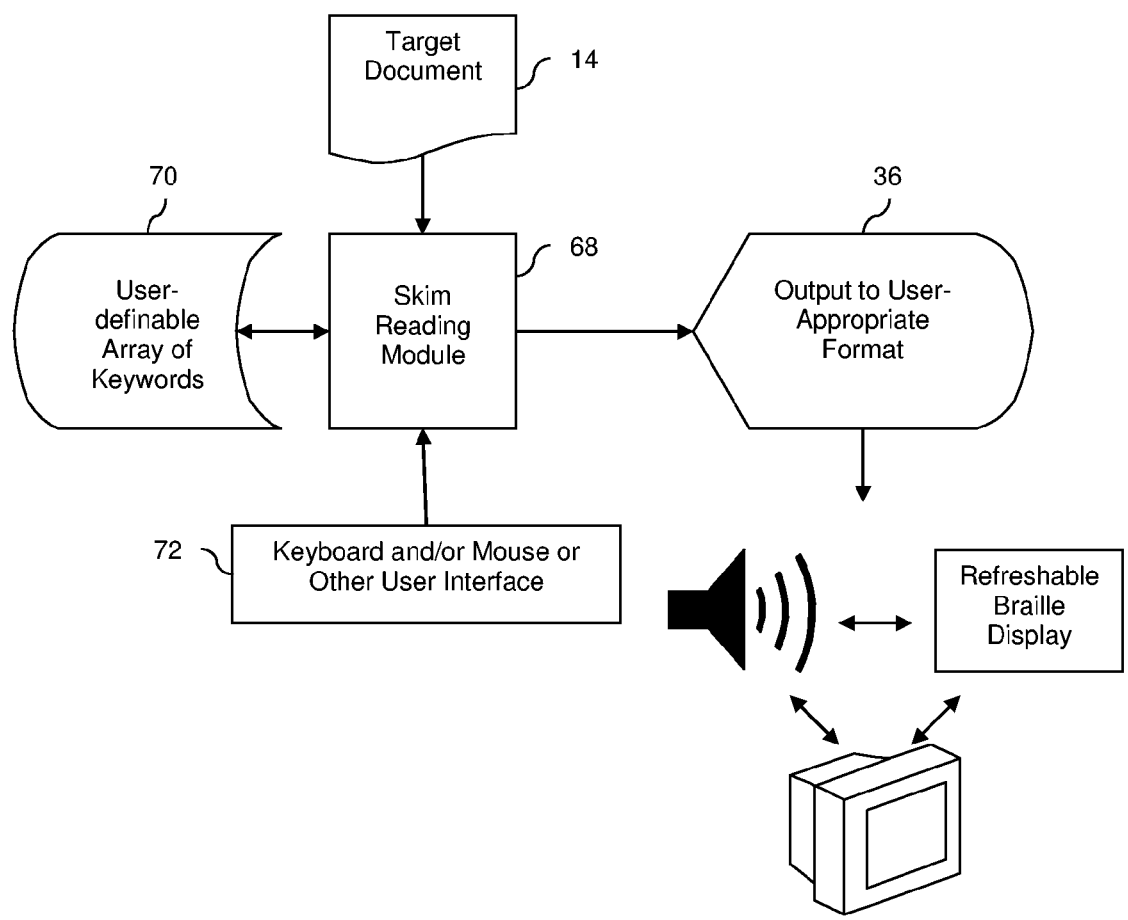
FIG. 5 is an illustration depicting the general user environment of a system according to the present invention.

Referring to FIG. 4 there is displayed another aspect of the skim-reader. In this aspect, rather than outputting the results using a speech synthesizer or a Braille display, a summary of a page or other section of a target document 14 can be output to a viewer 60 adapted to facilitate viewing by an individual with impaired vision. Each segment of text displayed by the viewer 60 provides a link back to the text of the target document 14. Selecting the link 62 enables the user to jump to that position in the original document 14. When the user is finished with that portion of the target 14, the user can redisplay the summary 66 to select different links to other sections of the target 14.

In an alternative embodiment of the invention, common mistakes such as missed capitals after punctuation, missing parentheses or quotes or multiple spaces or tabs are flagged during reading. The idea is that the Screen Reader utilizing a skim reader flags common mistakes which would otherwise be picked up by a sighted reader more efficiently. While word processors mark such mistakes inline, the screen reader may be instructed to give the information about the errors prior to reading the unit of text so that the reader can skip over text with no mistakes and find the text containing the errors in a more timely manner.

It will be seen that the advantages set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween. Now that the invention has been described,

What is claimed is:

1. A screen reader software program embodied in a computer readable medium, the software program comprising:
    a pattern store containing at least one user-definable array of keywords relating to a subject of interest;
    a skim reading module operable by the screen reader software program, the skim reading module scanning a target consisting of a single text-based document, the single text-based document preselected by a screen-reader user,
    the skim reading module adapted to locate the at least one array of keywords in the text-based target document;
    a speech synthesizer operable by the screen reader software program, the speech synthesizer providing an audible output for a predetermined user-defined portion of the target document that matches the at least one array of keywords; and
    an output configuration module, the output configuration module permitting the screen-reader user to selectively modify the predetermined portion of the target document matching the at least one array of keywords, wherein the predetermined portion of the target document is selected from the group consisting of characters, words, lines, sentences, paragraphs, pages, page breaks, and section breaks.

2. The software program of claim 1 wherein the pattern store is populated by historical collections of keyword arrays.

3. The software program of claim 1 wherein the target document and at least one array of keywords are associated together in the pattern store.

4. The software program of claim 1 further comprising a Boolean tag on each keyword instructing the screen reader software to include portions of the target document matching the keyword or exclude portions of the target document matching the keyword responsive to the state of the Boolean tag.

5. The software program of claim 1 further comprising a Boolean tag on each array of keywords instructing the screen reader software to include portions of the target document matching the array of keywords or exclude portions of the target document matching the array of keywords responsive to the state of the Boolean tag.

6. The software program of claim 1 further comprising an expression parser communicatively coupled to the reading module whereby keyword logic may be embedded into the at least one array.

7. A method of controlling the output of a screen reader program with an audible output to enable a target to be skimmed for display information comprising the steps of:
    scanning the target consisting of a single text-based document through the screen reader program, the document preselected by a screen-reader user;
    providing a computer with a pattern store, the text-based document residing on the computer;
    storing one or more text rules within the pattern store, wherein the text rules comprise one or more user defined elements;
    scanning the target for concurrence between the text of the target document and the one or more text rules;
    selecting a predetermined portion of the target to be outputted in response to a concurrence between the text of the target and the one or more text rules, wherein the predetermined portion of the target is selected from the group consisting of characters, words, lines, sentences, paragraphs, pages, page breaks, and section breaks;
    audibly outputting through the screen reader program the predetermined portion of the text of the target to the screen-reader user in response to the concurrence via a speech synthesizer.

8. The method of claim 7 wherein the text rule comprises one or more elements.

9. The method of claim 8 wherein the elements are specified by the screen-reader user.

10. The method of claim 7 wherein the elements are selected from the group consisting of keywords, punctuation and alphanumeric strings.

11. The method of claim 10 wherein the elements further comprise a Boolean tag wherein concurrence between text in the target document and the element of the text rule instructs the computer to include or exclude portions of the target document responsive to the state of the Boolean tag.

12. The method of claim 7 wherein the text rule comprises a Boolean tag wherein the concurrence between text in the target document and the text rule instructs the computer to include or exclude portions of the target document responsive to the state of the Boolean tag.

13. The method of claim 7 further comprising the step of prompting the screen-reader user responsive to the concurrence of a match between the array of keywords and the target document.

14. The method of claim 13 wherein the prompt precedes the output of a portion of the text of the target document.

15. The method of claim 14 wherein the prompt instructs the screen-reader user about the nature of the concurrence.

16. The method of claim 13 wherein the prompt follows the output of a portion of the text of the target document.

17. The method of claim 16 wherein the prompt requests an action from the screen-reader user responsive to the nature of the concurrence.

* * * * *